March 26, 1946.　　　　M. G. MANN　　　　2,397,282
PASSENGER BODY VENTILATOR
Filed Feb. 11, 1944　　　2 Sheets-Sheet 1
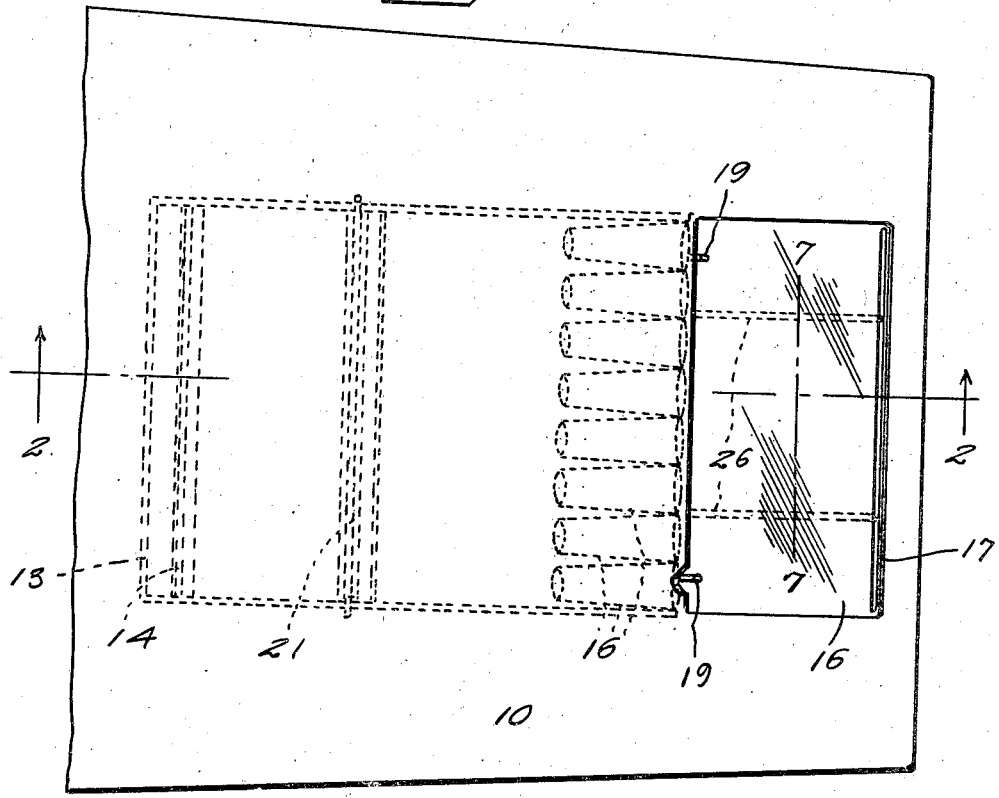
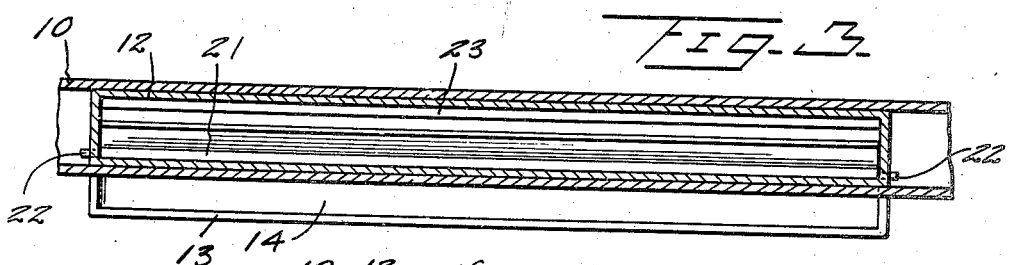
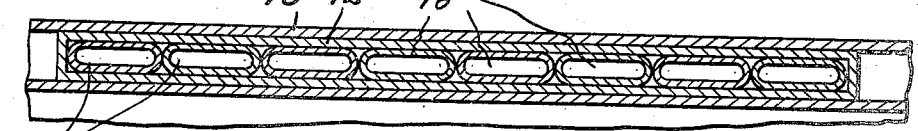
Inventor
Marion G. Mann
By L. F. Randolph
Attorney

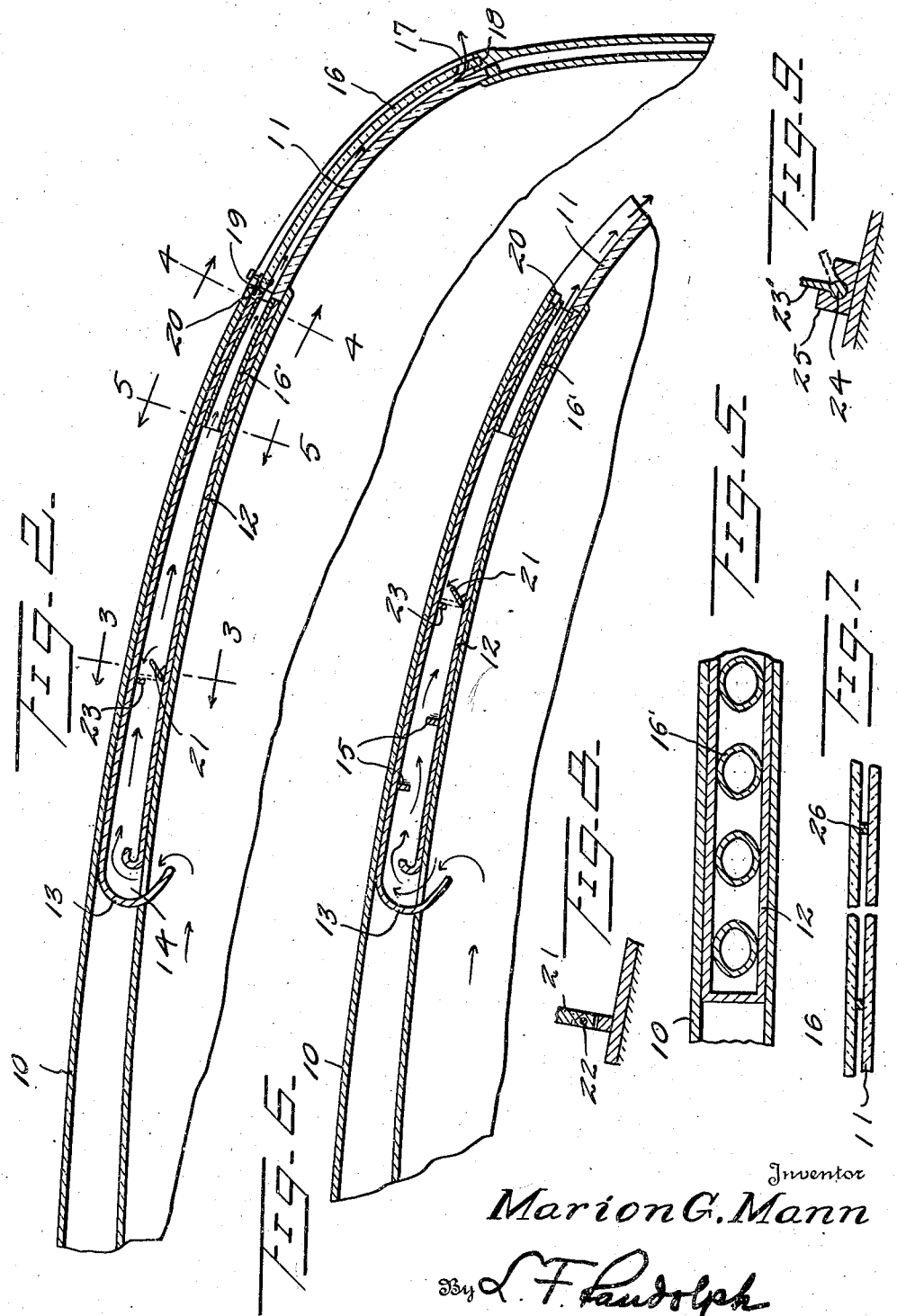

Patented Mar. 26, 1946

2,397,282

UNITED STATES PATENT OFFICE 2,397,282

PASSENGER BODY VENTILATOR

Marion G. Mann, Horseheads, N. Y.

Application February 11, 1944, Serial No. 521,994

3 Claims. (Cl. 98—2)

This invention relates to a ventilator for the interior of passenger bodies on self-propelled vehicles or any equivalent, such as automobiles, truck cabs, buses, aircraft, and boats.

It is a particular object to provide a means which avoids the use of an opening adjacent the front of the body and in which the air is extracted from the interior of the vehicle by a venturi action as the vehicle travels.

Another object is to provide for the discharge of the air over the rear window of the vehicle body in order to defrost the same.

It is also aimed to provide, especially for use in extremely cold weather, a removable supplementary window which is disposable over the rear window of the vehicle and which includes a slit or means for the escape of the air.

Still further, it is aimed to provide a construction having a closure or damper means which will be automatically closed in the event of backing of the vehicle.

The more specific objects and advantages will become apparent from a consideration of the description following taken in connection with the accompanying drawings illustrating an operative embodiment:

In said drawings:

Figure 1 is a plan view fragmentarily showing top of an automobile or other self-propelled vehicle equipped with my improvement;

Figure 2 is a central longitudinal sectional view on an enlarged scale taken on the line 2—2 of Figure 1;

Figure 3 is a cross sectional view taken on the line 3—3 of Figure 2;

Figure 4 is a cross sectional view taken on the line 4—4 of Figure 2;

Figure 5 is a detail section taken on the line 5—5 of Figure 2;

Figure 6 is a longitudinal section similar to Figure 2 but through a modified form;

Figure 7 is a cross section taken on the line 7—7 of Figure 1;

Figure 8 is a fragmentary enlarged section taken vertically and longitudinally of the vehicle, showing a damper as pivotally mounted; and Figure 9 is a view similar to Figure 8 showing a modified form of pivotally mounted damper.

Referring specifically to the drawings wherein like reference characters designate like or similar parts, 10 designates the wall of a body of a vehicle of the type set forth, for example being that of an automobile, particularly a fragment of the top and rear portions thereof, the same generally curving rearwardly and downwardly and having a rear glass window or light mounted therein at 11. The body of which the wall 10 forms a part usually is a passenger compartment although no limitation in this respect is to be inferred.

In carrying out the invention, I provide a relatively shallow hollow casing at 12 which may be made of any suitable material, for instance plastic, wood, or metal. This casing 12 is mounted in the wall 10 and has a forward curved wall at 13 extending below its bottom and into the interior of the body.

Immediately behind the curved wall 13 is an entrance slot 14 for air, the wall 10 being cut away or slotted so as not to obstruct said opening 14. Baffles 15 are located interiorly of the casing or ventilator 12 and at the rear end of such casing are therein a plurality of discharge tubes 16' which may be flatter at their rear ends as in Figure 4 than at the forward ends as in Figure 5. In addition, tubes are preferably tapered so that a better Venturi action will be created when the vehicle is in motion, aided by the air following the outer surface of the wall 10, to draw the air through the opening or slot 14, thence through the ventilator, and discharge it onto the rear light or glass 11. It will be realized that such air will be warmer than the outside or atmospheric air and hence it will function to defrost the window 11 in cold weather.

In parallelism to the light or glass 11, in cold weather, I use a supplemental removable light or glass 16 having an escape slot 17 therethrough adjacent its lower edge. It will be seen that the supplemental light 16' is secured in place in spaced relation to the light 11, being entered at its lower edge in a longitudinally extending groove 18 in the wall 10. This supplemental light 16' intimately fits the window frame and at its upper edge has a plurality of latches 19 pivoted thereto and adapted to be moved into or out of tapered slots or notches 20 in the window frame portion of the wall 10 to hold the light 16' against displacement. If desired, rubber tape or any equivalent may be applied to the sides of the light 16' and adjacent portions of the wall 10 about the window frame so that the heated air will be caused to travel effectively between the lights 16' and 11 before escape at the opening or slit 17.

Ordinarily the light 16' is not employed as shown in Figure 6. However, in extremely cold weather, the addition of the light 16' is desirable.

Interiorly of the casing of the ventilator 12, I may provide any suitable valve or damper 21 to enable the wall 10 or ventilator to be completely closed to the passage of air therethrough when desired. This damper, as shown in Figure 8, may be pivotally mounted as at 22 and normally is adapted for disposition at the angle shown in Figure 6, but when closed to abut the stop strip 23 as shown in dotted lines in the same figure. A conventional latch means may be employed to secure the closure 21 in closed position, but which will enable it to close automatically through impingement with the air against the same in the event of backing of the vehicle, to prevent the passage of the colder outside air into the vehicle.

In Figure 9 I show an alternative means or manner for mounting the closure, damper, or valve 21. Such valve in this form is designated 23' and has an enlarged rounded basal rib at 24 which is journaled in an open socket strip 25 so constructed and arranged that the valve 23' may rock to and from the closed and open positions, respectively shown by full and dotted lines, and be automatically movable to the closed position upon backing of the vehicle, and being capable of being latched to open position by any conventional means.

As shown in Figures 1 and 7, the auxiliary glass or light 16' may have division strips 26 fastened to its inner surface adapted to rest on the light 11; as a result, the air emitted by tubes 16 will effectively be divided into streams by the latter and into a less number and thinner streams between the lights 11 and 16', so that the heat from the air discharging between the lights will be more evenly applied thereto for escaping at the slot or slit 17.

Various changes may be resorted to provided that they fall within the spirit and scope of the invention.

I claim as my invention:

1. The combination with a vehicle having a surface skin shaped to produce the smooth flow of air thereover, and having an opening communicating with the interior of the vehicle at a point where the air flowing over the surface will act to cause a flow of air through the opening, of a ventilator having one end opening into the interior of the vehicle and its other end communicating with the opening in the surface of the vehicle, in combination with a window at said surface, and a removable light spaced from the window having an opening therethrough leading to the outside atmosphere to enable discharging air to pass between the light and window.

2. The combination with a vehicle having a surface skin shaped to produce the smooth flow of air thereover, and having an opening communicating with the interior of the vehicle at a point where the air flowing over the surface will act to cause a flow of air through the opening, of a ventilator having one end opening into the interior of the vehicle and its other end communicating with the opening in the surface of the vehicle, in combination with a window at said surface, and a light spaced from the window to enable discharging air to pass between the light and window, said light having a slit therethrough adjacent its lower edge communicating with the outside atmosphere for discharge of the air.

3. The combination with a vehicle having a surface skin shaped to produce the smooth flow of air thereover, and having an opening communicating with the interior of the vehicle at a point where the air flowing over the surface will act to cause a flow of air through the opening, of a ventilator having one end opening into the interior of the vehicle and its other end communicating with the opening in the surface of the vehicle, in combination with a window at said surface, and a light spaced from the window to enable discharging air to pass between the light and window, said light having a slit therethrough adjacent its lower edge communicating with the outside atmosphere for discharge of the air, the wall of the vehicle having said surface skin being provided with a groove entered by one edge of the light, and latch means to secure the light to said wall when the said edge entered in said groove.

MARION G. MANN.